K. C. COX.
SUBMARINE TELEGRAPHY.
APPLICATION FILED MAR. 23, 1915.

1,158,375.

Patented Oct. 26, 1915.

Witnesses
Jas. K. McCathron
David R. Wagner

Kenwrick C. Cox, Inventor
By E. G. Siggers
Atty.

UNITED STATES PATENT OFFICE.

KENWRICK C. COX, OF NORFOLK ISLAND.

SUBMARINE TELEGRAPHY.

1,158,375.  Specification of Letters Patent.  Patented Oct. 26, 1915.

Application filed March 23, 1915. Serial No. 16,516.

*To all whom it may concern:*

Be it known that I, KENWRICK CECIL COX, a subject of His Majesty the King of England, residing at Norfolk Island, South Pacific, electrician, have invented certain new and useful Improvements in Submarine Telegraphy, of which the following is a specification.

This invention relates to improvements in telegraphy in which a selenium relay is employed and in which a movable beam of light is controlled by the moving coil of the receiving instrument such as by means of a mirror carried thereby.

One feature of the present invention consists in the method of compensating for the inertia of the selenium by means of one or more inductive shunts.

A further feature consists in arranging the cell or cells in series with the receiving instrument and a battery so that the current tending to flow through the instrument is opposed by another battery or by mechanical means acting on the instrument as hereinafter described.

In order that the invention may be more clearly understood it is hereinafter described with reference to the accompanying drawings in which:—

Figure 1, Fig. 2, Fig. 3 and Fig. 4 are diagrams showing different arrangements of cells and connections hereinafter referred to.

Figure 1:
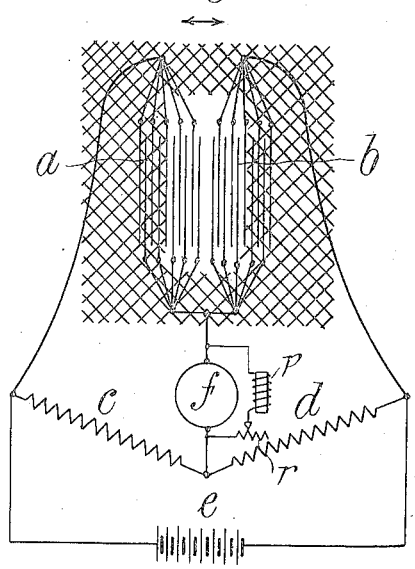

In one method of applying a pair of selenium cells to the purpose of the invention the two cells $a$ $b$ are, as shown in Fig. 1 of the drawings, arranged to form two arms of a Wheatstone bridge, suitable resistances $c$ $d$ forming the other two arms. A battery $e$ is joined in the usual manner across one diagonal of the bridge and the receiving instrument proper $f$ in which the magnified effect of the cable currents is to be produced is joined across the other diagonal—the said instrument $f$ may be a siphon recorder, or it may be a relay of any of the well known types or any other apparatus that may be required for any particular purpose.

The two selenium cells $a$ $b$ are arranged with respect to the beam of light reflected from the above mentioned mirror so that as shown each of them is partly illuminated and partly dark and so that as the beam of light is moved to one side or the other by the deflection of the mirror a larger part of one cell becomes dark and a larger part of the other cell light. It is usually best, but not always essential, that when the mirror is at rest half of each cell should be light and half dark. Also, in order to get the best results the two cells should be nearly alike as regards their characteristic curves, sensitivity and conductivity.

The bridge is balanced by means of the resistances $c$ $d$ so that when the mirror is at rest no current passes through the instrument $f$. But any deflection of the mirror varies the relative illumination of the two selenium cells increasing the conductivity of one and reducing that of the other so that the bridge balance is upset and a current passes through the instrument $f$ in one direction or the other according to the direction in which the balance has been upset, that is, according to the direction in which the mirror was deflected.

With a given mean conductivity the greater the sensitivity of the selenium cells to changes in illumination the greater will be the current that passes through the receiving instrument $f$ for a given movement of the mirror and its reflected beam of light, also of course the higher the voltage of the battery the greater will be the effect produced by any given movement of the mirror. Thus the effect of the currents received from the cable may be enormously magnified, a very small movement of the mirror produced by the cable current causing a considerable change in the relative conductivity of the two selenium cells $a$ $b$ and consequently causing a comparatively large current to pass the receiving instrument $f$. This magnified effect may be utilized so as to greatly increase the possible working speed of the cable, according to the well known principle that the smaller the current that can be utilized from the cable the greater the possible working speed, or it may be utilized to enable a coarse and simple receiving instrument or relay or other instrument to be used instead of the delicate instrument that must be used when it (the receiving instrument) is connected directly to the cable.

Figure 2:
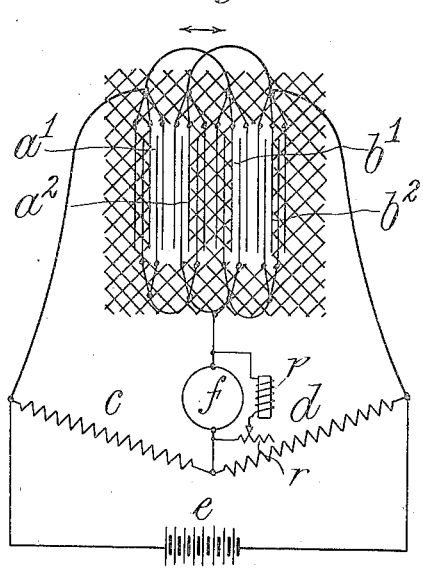

In order to utilize to the best advantage very small movements of the reflected beam of light, I may either subdivide the selenium cells as shown in Fig. 2 of the drawings, or use a series of separate narrow cells, the beam of light being split up into bars so that each bar effects one pair of cells $a'$ $a^2$ and $b'$ $b^2$ in the manner above described and the separate pairs of cells being joined up preferably as shown in such a way as to add together the effects of the separate changes of illumination. In Fig. 2 two pairs of cells only are shown but the same principle may be extended to any number of pairs of cells.

By properly proportioning the width of the cells and of the bars of light to the movement of the whole beam of light, the whole of the sensitive surface of the cells may be brought under the influence of this movement. With a pair of wide cells where the movement of the beam of light is large it may be made to cover the whole surface of one pair of cells, but where the movement is small with regard to the width of the cells only a small part of the surface of each cell would be affected by the change of illumination. Where there is no change of illumination there is no change of conductivity (temperature, voltage and other conditions remaining constant), and therefore those parts of the cells which are not subjected to change of illumination are merely carrying current which is wasteful.

Figure 3:
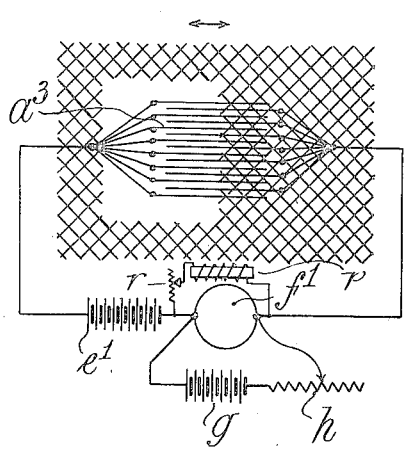

In another method, shown in Fig. 3, of applying a selenium cell to the purposes of my invention—the cell $a^3$ is arranged in series with a battery $e'$ and the instrument $f'$ which it is required to affect. The selenium cell $a^3$ is arranged with regard to the beam of light reflected from the mirror so as to be partly illuminated and partly dark, generally half of each. With this arrangement a current will be always passing through the instrument $f'$ unless it is neutralized by an opposing current from another battery $g$ provided for this purpose and which may be controlled by a suitable adjustable resistance $h$. Ordinarily the battery $g$ and resistance $h$ are adjusted so that the potential difference they produce at the terminals of the instrument $f'$ exactly neutralizes the potential difference due to the battery $e'$ when the mirror and beam of light are as shown in their zero position. Then any movement of the beam of light will vary the illumination of the selenium cell $a^3$, its conductivity will vary accordingly and the potential difference produced at the terminals of instrument $f'$ by the battery $e'$ will rise above or fall below that produced by battery $g$ according as the conductivity of the selenium cell $a^3$ is increased or diminished, and the receiving instrument $f'$ will thus respond to the changes in illumination of the cell $a^3$.

Figure 4:
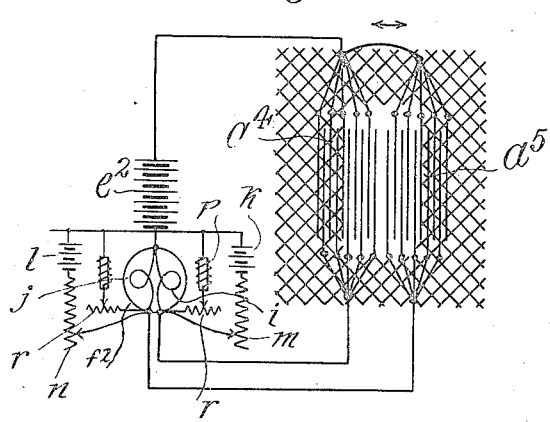

It will be understood that instead of employing an opposing potential difference as above described to keep the current through the instrument $f'$ at zero when the beam of light is in its zero position, the same effect may be brought about by other means, and especially by mechanical means. This arrangement is subject to the disadvantage that the characteristic curve of change of conductivity of selenium with an increase of illumination is somewhat different to the curve obtained with a decrease of illumination, in the latter case the inertia is greater and the first, nearly instantaneous part of the curve is shorter. In order to avoid this disadvantage two cells $a^4$ $a^5$ are arranged as shown in Fig. 4 so that as the illumination of one is increased that of the other is decreased. One cell $a^4$ is joined in series with a battery $e^2$ and a coil $i$ of the receiving instrument and the other cell $a^5$ in series with the said battery $e^2$ and another coil $j$ of the instrument $f^2$. The two coils $i$ and $j$ are so arranged that the current from the battery $e^2$ traverses them in opposite directions and they may be two windings of a siphon recorder coil, of a relay coil or of whatever instrument is used in connection with this invention.

Now, as the illumination of one cell say $a^4$ is increased its conductivity is increased and an increase of current takes place in one of the coils $i$. At the same time the illumination of the other cell $a^5$ is decreased and a decrease of current takes place in the other coil $j$. As the current traverses both coils $i$ $j$ in opposite directions, the effect of the increase of current in the one coil is the same as that of a decrease in the other, so that for instance, if the coils are the two windings of a siphon recorder coil the effect of both windings on its movement will be the same. When the illumination of one cell $a^5$ is increased that of the other cell $a^4$ is decreased and the reverse effect produced on the instrument. With this arrangement a compensating battery such as that previously described at $g$ in Fig. 3 is unnecessary as the relative illumination and consequently the relative conductivity of the two cells $a^4$ $a^5$ may be adjusted so that with the beam of light in its zero position as shown the opposing currents in the two coils $i$ $j$ just balance each other. It may, however, sometimes be desirable to use compensating batteries $k$ $l$ with series resistances $l$ $m$ in order to prevent an unduly large current from flowing through the two coils $i$ and $j$ of the instrument. With two cells $a^4$ $a^5$ thus arranged the mean is obtained in the movement of the receiving instrument of the two curves. This mean is also obviously obtained with the arrangements hereinbefore first described with reference to Figs. 1 and 2 of the drawings. The latter arrangement may however in certain cases be the more advantageous, as by it the whole change of conductivity in the selenium cells $a^4$ $a^5$ becomes directly available to operate the receiving instrument.

It is obvious that the arrangement of cells last described with reference to Figs. 3 and 4 may be modified as first described in the two previous arrangements Figs. 1 and 2 in order to make efficient use of very small movements of the beam of light; narrow cells, or sections of a cell being used and the beam of light being split up into bars. Also the cells may be arranged in relation to the beam or beams of light either as shown in Figs. 1, 2 and 4 or as in Fig. 3 of the drawings so that the beam of light passes from one small section of selenium to another Figs. 1, 2 and 4 or as in Fig. 3 so that the illumination of all the sections is varied simultaneously.

In the application of this invention to submarine telegraphy it is necessary to eliminate the effect of the inertia of selenium, the first quick part of the change of conductivity being all that is of use. An inductive or "magnetic" shunt which is ordinarily connected across the receiving circuit to shunt off slowly varying currents from the receiving instrument, and generally to sharpen the signals, is usually sufficient for the purposes of this invention. The effect on the signals of the inertia of the selenium is to greatly increase their "mounting" or "climbing up" appearance, and this is entirely checked by suitable use of the said inductive shunt, the resistance in series with the shunt being made much lower than usual and the inductance being suitably adjusted.

In some cases I may use an inductive shunt across the receiving instrument $f$ of Figs. 1 and 2 or $f^1$, $f^2$, of Figs. 3 and 4, in addition to the one joined, in the usual manner, across the main receiving circuit, or in certain cases I may connect the inductive shunt across the receiving instrument and have no inductive shunt across the main receiving circuit.

The inductive shunt across the receiving instrument is shown in the drawings as consisting of an inductive resistance $p$ with a variable ohmic resistance $r$ in series therewith.

What I claim is—

1. In telegraphy, a selenium relay comprising associated selenium cells arranged to form two arms of a Wheatstone bridge with suitable resistances in the other arms to balance the bridge, a source of current connected across one diagonal of the bridge, and a receiving instrument and an inductive resistance in shunt one to the other connected across the other diagonal of the bridge.

2. In telegraphy, a selenium relay having an inductive shunt around the receiving instrument adjusted to compensate for the inertia of the selenium.

3. In telegraphy, a recording instrument and battery, selenium elements in series with said battery, and means associated with the selenium elements, recording instrument and battery to normally oppose the flow of current from the battery through the instrument.

In testimony whereof I have signed this specification in the presence of two subscribing witnesses.

K. C. COX.

Witnesses:
R. E. NOBLE,
A. K. CAMPBELL.